F. B. MALLORY.
BLOCK.
APPLICATION FILED FEB. 17, 1920.
1,359,904.
Patented Nov. 23, 1920.
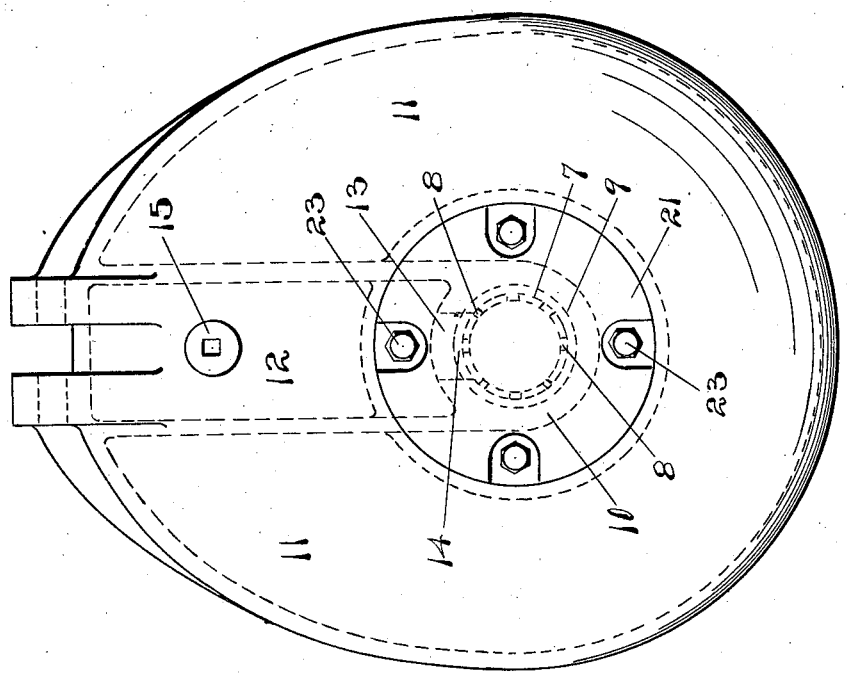
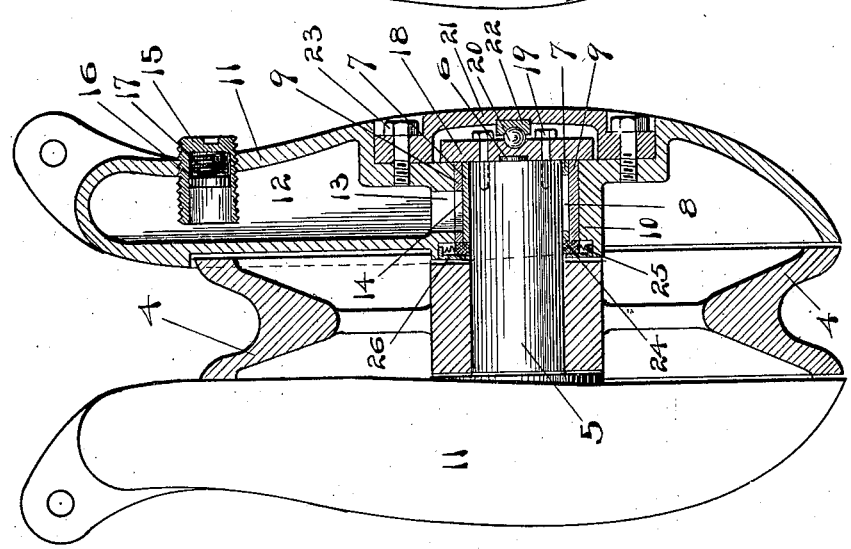
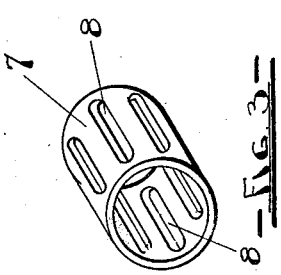
INVENTOR
FREDERICK B. MALLORY
BY
C. F. Blake
ATTORNEY

UNITED STATES PATENT OFFICE.

FREDERICK B. MALLORY, OF PORTLAND, OREGON.

BLOCK.

1,359,904.  Specification of Letters Patent.  Patented Nov. 23, 1920.

Application filed February 17, 1920. Serial No. 359,468.

*To all whom it may concern:*

Be it known that I, FREDERICK B. MALLORY, a citizen of the United States, residing at Portland, county of Multnomah, State of Oregon, have invented certain new and useful Improvements in Blocks, of which the following is a specification.

My invention relates to blocks in general, and particularly to rope or chain blocks as used in logging and like operations, the object being to provide a block of very simple and rugged construction the sides of which are bound together through the agency of the sheave pin and having improved lubrication features.

I accomplish the above object by means of the construction illustrated in the accompanying drawing, which is a part of this application for Letters Patent, like characters of reference indicating like parts throughout the several views thereof, and in which:

Figure 1 is a side elevation of a block embodying my device.

Fig. 2 is an end elevation of a block embodying my device, parts being broken away to best illustrate the construction.

Fig. 3 is a perspective view of the sheave pin bushing.

In materializing my invention I have used a rope sheave 4 secured to a sheave pin 5 in any convenient manner, such as a press fit as illustrated in the drawing. The sheave pin 5 is a plain cylindrical pin having upon each end thereof a dowel 6 integral with the pin, as shown in Fig. 2. Upon each end of said sheave pin is disposed a bushing 7 freely mounted upon the pin and having therein a plurality of slots 8 passing entirely through the body of the bushing, as shown in Fig. 3.

Said bushing 7 is freely mounted within a bushing 9 which latter bushing is secured within the hub 10 of the block side 11 in any convenient manner, preferably by making the bushing a press fit within said hub, as illustrated in Fig. 2.

The bushing 7 is preferably made of bronze while the bushing 9 is made of steel, and the bushing 7 is rotatable both upon the sheave pin 5 and within the bushing 9.

A suitable lubricant chamber 12 is formed within the block side 11, and an orifice 13 in the hub 10 registers with a similar orifice 14 in the bushing 9, thereby providing that the lubricant within the chamber 12 may come into contact with the bushing 7, as shown in Fig. 2. The bushing 7, by means of its slots 8 collects this lubricant as said bushing rotates, and thereby the lubricant is distributed both to the surfaces of contact between the bushings 7 and 9 and also to the surfaces of contact between the bushing 7 and the sheave pin 5. The lubricant used may be either oil or grease, preferably the latter, and when grease is used a compression of the same sufficient to force it into the grooves 8 of the bushing 7 is provided by a compression plug 15. Said plug is screwed into the block side 11 and communicates with the interior of the lubricant chamber 12, and is provided with a slidable head or diaphragm 16 actuated by a spring 17 intermediate said head and the closed end of said plug.

To secure the block sides 11 together in their relative positions, using the sheave pin 5 as the securing member, I provide upon each end of said sheave pin a collar 18 of sufficient diameter to engage with the surface of the hub 10 of the block side, as shown in Fig. 2, said collar being centered upon the dowel 6 of said sheave pin, and secured to the latter by suitable bolts 19. A ball 20 is interposed between the block side cap 21 and the collar 18, a suitable bearing plate 22 for said ball being provided in said cap, and said cap being secured to the respective block side by suitable bolts 23. By this construction all relative longitudinal movement of the sheave pin 5 and the block side 11 is prevented.

To prevent escape of the lubricant around the sheave pin 5 I provide within a counterbore in the inner end of the hub 10 a yieldable collar, 24, preferably of felt or the like, pressed upon the sheave pin by a plurality of springs 25 and secured in place within said counterbore by a cap 26.

My device may be made of any size, and constructed of any materials deemed convenient and suitable for a device of this character, and while I have illustrated and described a form of construction and arrangement of parts found desirable in materializing my invention, I wish to include in this application for Letters Patent all mechanical equivalents or substitutes that may fairly be considered to come within the scope and purview of my invention as defined in the appended claims.

Having disclosed my invention so that others may be enabled to construct and to use the same, what I claim as new and desire to secure by Letters Patent is:

1. In a block side, a sheave; a sheave pin secured to said sheave; a pair of block sides; a cap secured to each of said block sides adjacent to the respective end of said sheave pin; a collar secured upon each end of said sheave pin and contacting with the hub of the respective block side; and a ball intermediate each of said collars and the respective of said caps.

2. In a block, a sheave; a sheave pin secured to said sheave; a pair of block sides; a cap secured to each of said block sides adjacent to the respective end of said sheave pin; and means intermediate said cap and the hub of said block side respective thereto and mounted upon the end of said sheave pin to secure said sheave pin from longitudinal movement within the respective of said block sides.

3. In a block, a sheave; a sheave pin secured thereto; a pair of block sides, each containing a lubricant chamber; a bushing secured within the hub of each of said block sides; a bushing mounted upon each of the journals of said sheave pin, and rotatable both upon said journal and within said first mentioned bushing; each of said bushings having orifices therein communicating with said lubricant chamber.

4. In a block, a sheave, a sheave pin secured thereto, and a block side, in combination with a pair of concentric bushings mounted upon the journal of said sheave pin, the outer bushing being secured within its respective block side, and the inner bushing being rotatable within said outer bushing and upon said sheave pin; means to lubricate both the outer and inner surfaces of said rotatable bushing; and means mounted upon the end of said sheave pin to secure the same from longitudinal movement within said block side.

5. A block side, a cap thereto, a sheave pin and a sheave secured thereon, in combination with means mounted upon said sheave pin intermediate said block side and said cap to secure said sheave pin from longitudinal movement within said block side.

In witness whereof I claim the foregoing as my own I hereunto affix my signature in the presence of two witnesses, at Portland, county of Multnomah, State of Oregon, this 21st day of Jan., 1920.

FREDERICK B. MALLORY.

Witnesses:
C. F. BLAKE,
L. J. ROBINSON.